United States Patent [19]

Holmes

[11] 4,393,397

[45] Jul. 12, 1983

[54] TELEVISION GHOST SIGNAL DETECTOR WITH COLOR BURST PHASE DELAY CONTROL

[75] Inventor: David D. Holmes, Chesterfield, N.J.

[73] Assignee: RCA Corporation, New York, N.Y.

[21] Appl. No.: 308,838

[22] Filed: Oct. 5, 1981

[51] Int. Cl.³ .............................................. H04N 5/21
[52] U.S. Cl. ..................................... 358/36; 358/167; 358/905
[58] Field of Search .................. 358/166, 167, 36, 35, 358/37, 155, 905

[56] References Cited

U.S. PATENT DOCUMENTS

| | | |
|---|---|---|
| 3,824,340 | 7/1974 | Sensney . |
| 3,974,520 | 8/1976 | Kuroyanagi . |
| 4,128,848 | 12/1978 | Nakagawa . |
| 4,314,277 | 2/1982 | Pritchard et al. .................. 358/167 |
| 4,359,760 | 11/1982 | Holmes .............................. 358/167 |

OTHER PUBLICATIONS

Article "Performance Evaluations of Selected Automatic Deghosting Systems for Television" by S. Goyal, et al., published in the IEEE Transactions on Consumer Electronics, vol. CE–26, 2/80, p. 102.

Primary Examiner—Tommy P. Chin
Attorney, Agent, or Firm—E. M. Whitacre; P. J. Rasmussen; P. M. Emanuel

[57] ABSTRACT

A television ghost signal detector system is provided which includes a variable delay line for delaying training signal components of the main video signal. The training signal includes burst signals and may comprise, for example, the horizontal sync pulse and burst signals of the lines of the vertical blanking interval which follow the last equalizing pulse interval. The delay of the delay line is first varied until the delayed horizontal sync pulse of the main signal is in substantial time coincidence with its ghost horizontal sync pulse at the input of the delay line, and the delayed main burst signal and its ghost are in substantial time coincidence. Thereafter, the two burst signals are compared by a phase detector, the output of which is used as a control signal to control the delay of the variable delay line so as to maintain the delayed and undelayed signal in virtually complete coincidence.

9 Claims, 8 Drawing Figures

TELEVISION GHOST SIGNAL DETECTOR WITH COLOR BURST PHASE DELAY CONTROL

This invention relates to television ghost signal cancellation systems in general and, in particular, to a ghost signal detector arrangement for such a system in which the phase of the burst signal components of the main and ghost signals are detected and used for improved ghost signal tracking.

My U.S. Pat. No. 4,364,092 filed Jan. 26, 1981 and entitled "TELEVISION SIGNAL GHOST DETECTOR", describes an arrangement for detecting the presence and time location of a television ghost signal with respect to the desired, or main, television signal. In that arrangement, a training signal of known characteristics contained in the detected video signal is applied to a variable delay line. When the television signal is contaminated with a ghost signal, the training signal will be followed by a replica, or ghost, of itself. The training signal and its ghost signal are repetitively applied to the variable delay line and the delay of the line is incrementally changed until the delay is such as to cause the training signal of the main signal to exit from the variable delay line at the same time as its ghost is entering the delay line. A coincidence detector detects this condition, whereupon control of the delay of the delay line is assumed by an automatic phase control circuit, which tracks the time location of the ghost signal and maintains the coincident condition. Thereafter, a ghost cancellation arrangement using a similar variable delay line is activated to cancel the ghost signal. The delayed main signal at the output of the variable delay line of the ghost cancellation arrangement is inverted to produce a pseudo-ghost signal, which signal is combined with the contaminated video signal to cancel the ghost video signal. Such a ghost cancellation arrangement is described in my U.S. Pat. No. 4,359,760 filed Jan. 26, 1981, and entitled "TELEVISION GHOST CANCELLATION SYSTEM".

The training signal used in the above-described ghost detector comprises a component of the video signal of known characteristics. Examples of such training signals include the transition occurring during line 266 of the vertical blanking interval, the horizontal sync pulses occuring during the vertical blanking interval, and specially transmitted pulses inserted into unused lines of the vertical blanking interval, such as sine-squared pulses. In the cases of the line 266 and vertical blanking interval horizontal sync pulses, it has been found that an automatic phase control loop responsive to these signals will not maintain the delay of the delay line as precisely as desired for virtually complete cancellation of the ghost by the ghost canceller. In particular, it is desirable to maintain the alignment of the delayed main signal and the ghost signal to within 200 nanoseconds, which is approximately the scanning time of two adjacent picture tubes phosphor elements in an NTSC television system receiver. The infrequent occurrence of the transitions of the above-mentioned training signals makes maintenance of this accuracy by the automatic phase control circuit unreliable.

In accordance with the principles of the present invention, a television ghost signal detector system is provided which includes a variable delay line for delaying training signal components of the main video signal. The training signal includes burst signals and may comprise, for example, the horizontal sync pulse and burst signals of the lines of the vertical blanking interval which follow the last equalizing pulse interval. The delay of the delay line is first varied until the delayed horizontal sync pulse of the main signal is in substantial time coincidence with its ghost horizontal sync pulse at the input of the delay line, and the delayed main burst signal and its ghost are in substantial time coincidence Thereafter, the two burst signals are compared by a phase detector, the output of which is used as a control signal to control the delay of the variable delay line so as to maintain the delayed and undelayed signal in virtually complete coincidence.

Figure 1:
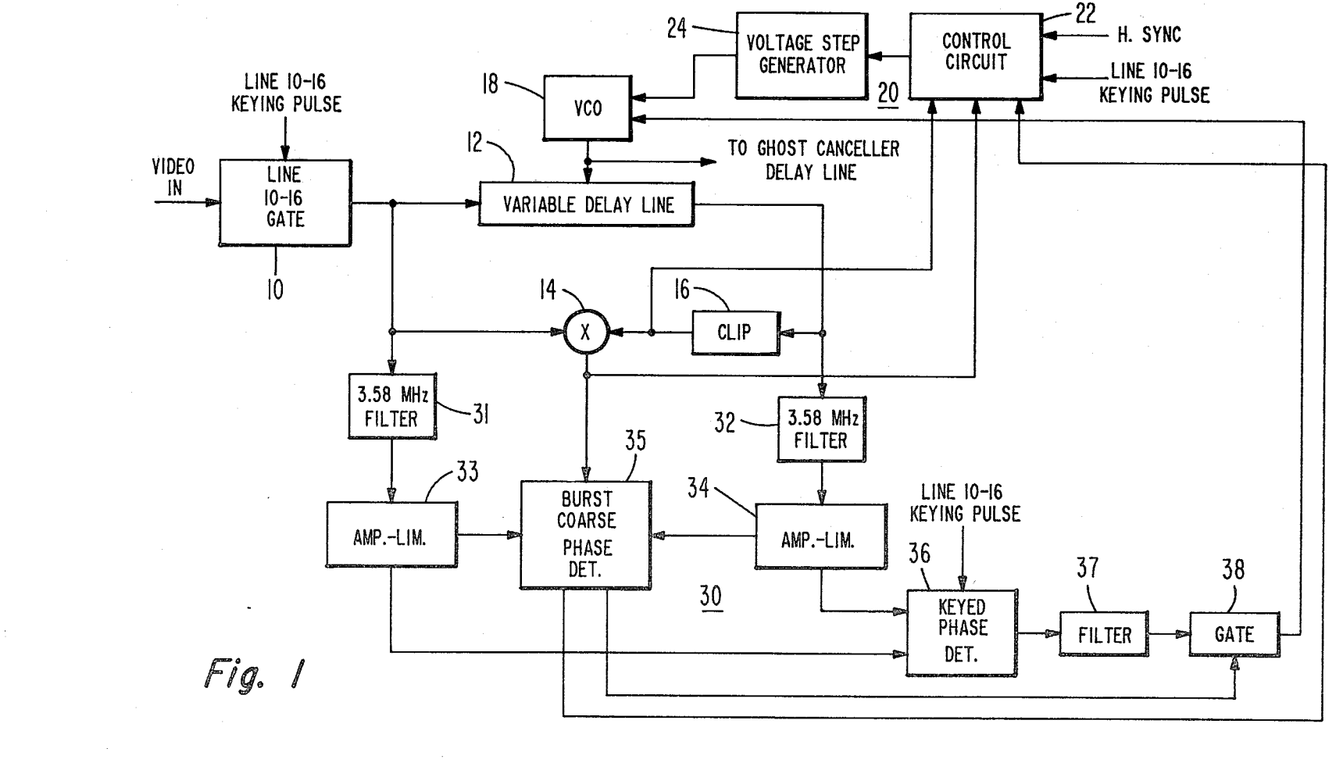
FIG. 1 illustrates in block diagram form a television ghost signal detector constructed in accordance with the present invention.

Referring to the ghost signal detector arrangement of FIG. 1, a detected video signal which may be contaminated with a ghost signal is applied to the input of a lines ten-sixteen gate 10. The lines ten-sixteen gate is keyed by a lines 10–16 keying pulse to pass lines 10–16 of each field of a video signal. The lines 10–16 keying pulse may be derived by a vertical count-down arrangement in a similar manner as the line ten enable signal developed by the vertical count-down arrangement shown in FIG. 3 of the aforementioned U.S. Pat. No. 4,364,092. The lines passed by the gate 10 are those seven lines of the vertical blanking interval immediately following the second equalizing pulse interval. Each of these lines contains a horizontal synchronizing pulse followed by eight to eleven cycles of a color burst signal and no video information. The horizontal sync pulses and the burst signal of these lines are used as training signals in the arrangement of FIG. 1.

The signals passed by the gate 10 are applied to the input of a variable delay line 12, an input of a coincidence detector 14, and a 3.58 MHz filter 31. The variable delay line 12 may comprise, for instance, a charge-coupled device (CCD) delay line which includes a series of parallel-clocked stages. The CCD delay line in this illustration may include, for example, 120 stages, clocked by a voltage controlled oscillator (VCO) signal which is variable over a range of 8 to 20 MHz. This provides a variable delay in the range of 6–15 microseconds. Other combinations of delay line lengths and clock frequencies could also be used. For example, a 100 stage delay line clocked by a 10–15 MHz clock would provide a variable delay in the range of 6.67–10 microseconds.

The output of the delay line 12 is coupled to inputs of a clipping circuit 16 and a 3.58 MHz filter 32. The clipping circuit 16 functions in the same manner as a sync signal separator, and acts to pass the delayed horizontal sync signals to the exclusion of the burst signal components of lines 10–16. The output of the clipping circuit 16 is coupled to a second input of the coincidence detector 14, which produces an output signal when the delayed main sync signal at one input is wholly or partially in time coincidence with the ghost sync signal at its other input. The output of the clipping circuit 16 is also coupled to an input of a control circuit 22. The output of the coincidence detector 14 is coupled to an input of the control circuit 22, and also to the input of a burst coarse phase detector 35.

The outputs of the 3.58 MHz filters 31 and 32 are coupled to the inputs of amplifier-limiter circuits 33 and 34, respectively. The amplifier-limiter circuits apply amplified and limited replicas of the burst signals to inputs of the burst coarse phase detector 35, and amplified burst signals to inputs of a keyed phase detector 36. The detector 36 is keyed by the lines 10-16 keying pulse. The output of the phase detector 36 is coupled by way of a filter 37 to the input of a gate circuit 38. The output of the gate circuit 38 is coupled to one input of a VCO 18. Outputs of the burst coarse phase detector 35 are coupled to the gate circuit 38 and to the control circuit 22.

The control circuit 22 also receives the lines 10-16 keying pulse and horizontal sync pulses, derived from the video signal, at its remaining inputs. An output of the control circuit is coupled to the input of a voltage step generator 24, the output of which is coupled to the VCO 18. The VCO produces a clock signal at its output which is used to control the delay of the variable delay line 12 and the delay of a similar delay line of a ghost canceller (not shown). The ghost canceller may be of the type described in the aforementioned U.S. Pat. No. 4,359,760.

The arrangement of FIG. 1 detects and tracks ghost signals during the lines 10-16 intervals by automatically adjusting the delay of the delay line 12 until the main signal is delayed by the time interval between the main and ghost signals. The delay of the delay line is controlled by the VCO, which in turn is controlled by coarse adjustment circuitry 20, including illustrated elements 22 and 24, and by fine adjustment circuitry 30, including illustrated elements 31-38. The coarse adjustment circuitry 20 incrementally changes the delay of the delay line until the delayed training signals at its output are produced in approximately full time coincidence (i.e., aligned to within one burst cycle) with their corresponding ghost training signals at the input of the delay line. This coarse alignment of the two signals is sensed by the burst coarse phase detector 35, which then causes the VCO to be finely adjusted by the circuit signal produced by the phase detector 36, which represents the phase relationship between the delayed, main signal burst and its corresponding ghost burst signal.

The ghost signal must first be detected by the coarse adjustment circuitry 20. The control circuit 22 is capable of causing the voltage step generator 24 to increment the VCO 18 over its full range of frequencies. The VCO frequency is changed by circuitry 20 toward the end of each of lines 10-16 during every field. If no ghost signal is detected, as indicated by the generation of a coincidence pulse by the coincidence detector 14, the circuitry will continue to cycle the VCO over its frequency range.

When a ghost signal is present, the coarse adjustment circuitry will at some point reach a control condition in which the delayed main sync signal is at least in partial time coincidence with its ghost sync signal. The coincidence detector 14 will then produce a coincidence pulse during the coincident condition. The coincidence pulse causes the burst coarse phase detector 35 to begin to examine the phase relationship of the main delayed and ghost burst signals. If the two burst signals are not within one burst cycle of alignment, the coarse adjustment circuitry 20 is permitted to continue to control the VCO 18 until that burst signal alignment is achieved. Once the burst signals are aligned to within one cycle, the burst coarse phase detector 35 disables the control circuit 22 and closes gate 38 so that control of the VCO 18 is assumed by the burst phase detector 36. The fine adjustment circuitry 30 then continually operates to maintain the delay of the delay line 12 to which one half of a burst cycle, or 140 nanoseconds, of the time delay between the main and ghost signals. The delay of the delay line in the ghost canceller is also controlled by the signal from the VCO 18 for virtually complete cancellation of the ghost signal.

Figure 2:
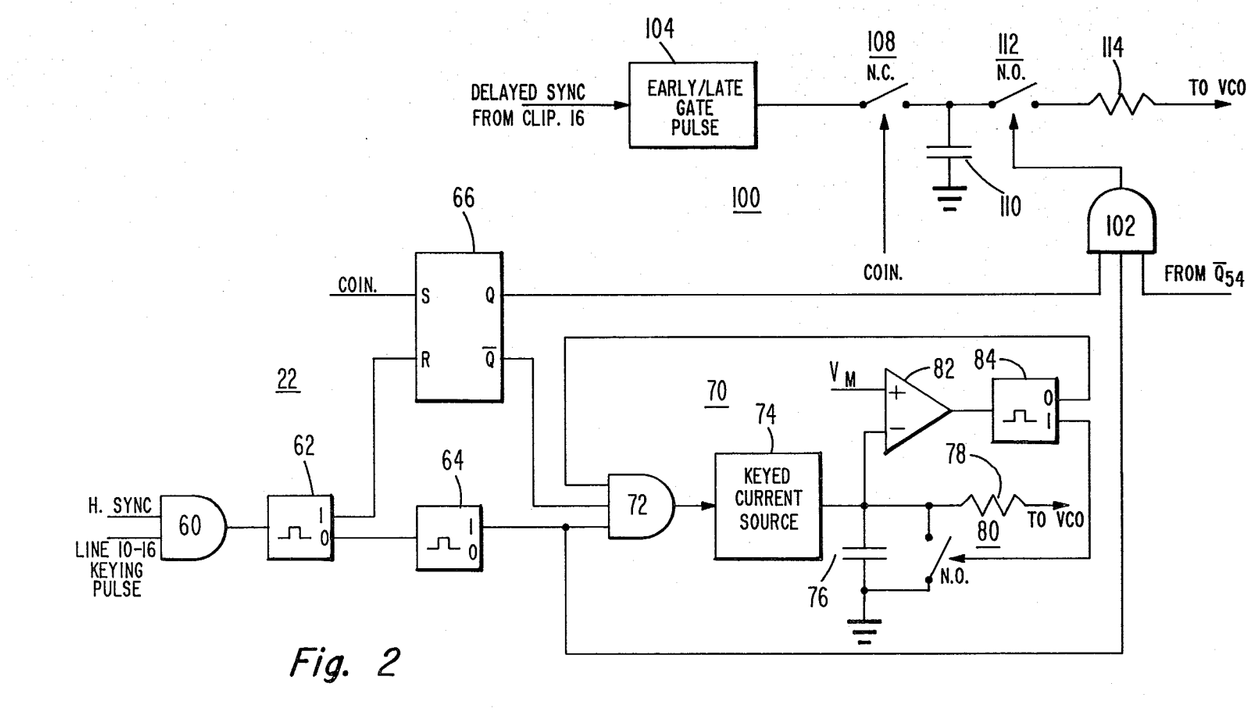
FIG. 2 illustrates, partially in block diagram form and partially in schematic diagram form, a more detailed embodiment of the coarse training signal alignment circuitry of FIG. 1.

A more detailed embodiment of the coarse adjustment circuitry 20 of FIG. 1 is illustratively shown in FIG. 2. Horizontal sync signals derived from the video signal, and line 10-16 keying pulses, are applied to inputs of an AND gate 60. The output of AND gate 60 is coupled to the input of a monostable multivibrator 62. The high-going output ("1") of the monostable multivibrator 62 is coupled to a reset input (R) of an R-S flip-flop 66, and the low-going output ("0") of the monostable multivibrator 62 is coupled to the input of a second monostable multivibrator 64. The "1" output of monostable multivibrator 64 is coupled to an input of an AND gate 72 and to an input of an AND gate 102. The set input (S) of R-S flip-flop 66 is coupled to receive coincidence pulses produced by the coincidence detector 14 of FIG. 1. The Q output of flip-flop 66 is coupled to an input of AND gate 102, and the $\overline{Q}$ output of flip-flop 66 is coupled to a second input of AND gate 72. Elements 60-66 of FIG. 2 correspond to the control circuit 22 of FIG. 1.

The output of AND gate 72 is coupled to the keying input of a switched or keyed current source 74. When keyed, the current source 74 supplies charging current to a capacitor 76, coupled between the output of the current source and ground. The output of the current source 74 is also coupled to VCO 18 of FIG. 1 by a resistor 78, and to an input of a comparator 82. A normally open switch 80 is coupled in parallel with capacitor 76. A second input of comparator 82 is coupled to receive a reference voltage $V_M$. The output of comparator 82 is coupled to an input of a monostable multivibrator 84. The "0" output of monostable multivibrator 84 is coupled to a third input of AND gate 72, and the "1" output of monostable multivibrator 84 is coupled to controllably close normally open switch 80. Elements 72-84 together comprise an incremental delay adjustment circuit 70 to control the delay of the variable delay line 12 through control of VCO 18.

The output of AND gate 102 is coupled to controllably close a normally open switch 112. Switch 112 is coupled to series with a normally closed switch 108, and a resistor 114 between the output of an early/late gate pulse generator 104 and an input of the VCO 18. The early/late gate pulse generator 104 operate substantially as described in my U.S. Pat. No. 4,371,266 filed Jan. 30, 1981, and is triggered by the delayed horizontal sync pulses produced by the clipping circuit 16 of FIG. 1. The switch 108 is controllably opened in response to the coincidence pulses produced by the coincidence detector 14. A capacitor 110 is coupled between the junction of switches 108 and 112, and ground. Elements 102-114 of FIG. 2 together comprise a coincidence adjustment circuit 100.

Figure 3:
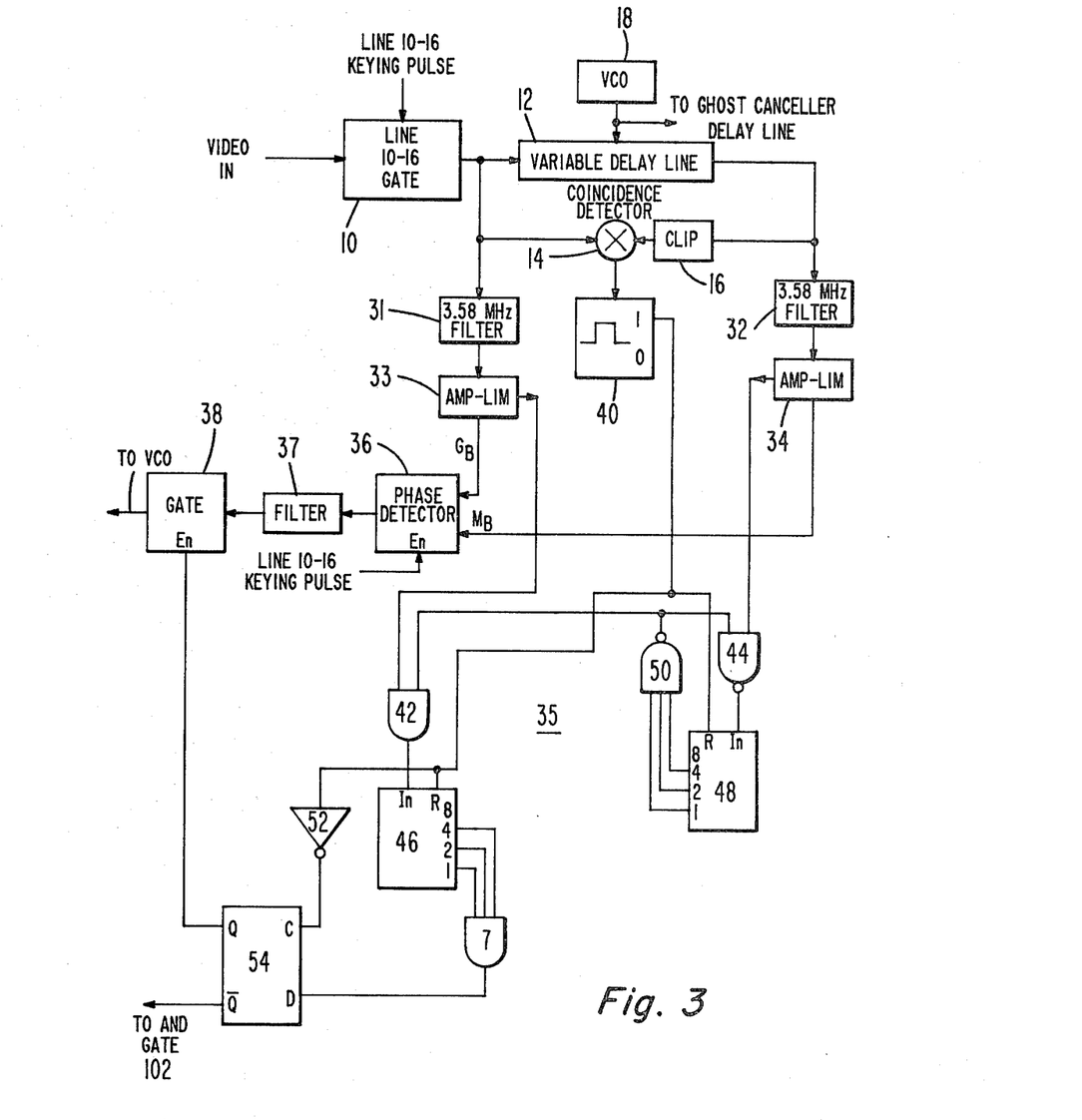
FIG. 3 illustrates, partially in block diagram form and partially in logic diagram form, a more detailed embodiment of the burst phase alignment circuitry of FIG. 1.

A more detailed embodiment of the fine adjustment circuitry 30 of FIG. 1 is illustratively shown in FIG. 3. Elements previously described in FIG. 1 are shown in FIG. 3 and bear the same reference numerals. The output of coincidence detector 14 is coupled to the input of a monostable multivibrator 40, the "1" output of which is coupled to reset inputs (R) of two counters 46 and 48, and to the input of an inverter 52. The amplified and limited ghost burst signal produced by amplifier-limiter 33 is applied to one input of an AND gate 42, and the amplified and limited delayed main burst signal is applied to an input of a NAND gate 44 from amplifier-limiter 34. The amplifier-limiter 33 also provides an amplified ghost burst signal, $G_B$, to phase detector 36, and the amplifier-limiter 34 provides an amplified delayed main burst signal, $M_B$, to the phase detector 36. The output of AND gate 42 is coupled to the signal input of counter 46, and the output of NAND gate 44 is coupled to the signal input of counter 48.

Counters 46 and 48 may be three-bit counters with outputs corresponding to counts of one, two, and four. The one, two and four outputs of counter 46 are coupled to inputs of an AND gate 7, and the one, two and four outputs of counter 48 are coupled to inputs of a NAND gate 50. The output of NAND gate 50 is coupled to respective inputs of gates 42 and 44, and the output of AND gate 7 is coupled to the date input (D) of a D-type flip-flop 54. The clock input (C) of flip-flop 54 is coupled to the output of inverter 54. The $\overline{Q}$ output of flip-flop 54 is coupled to a second input of AND gate 102 of FIG. 2, and the Q output of flip-flop 54 is coupled to the enable input of gate 38. Elements 40-54 of FIG. 3 together correspond to the burst coarse phase detector 35 of FIG. 1.

Figure 4:
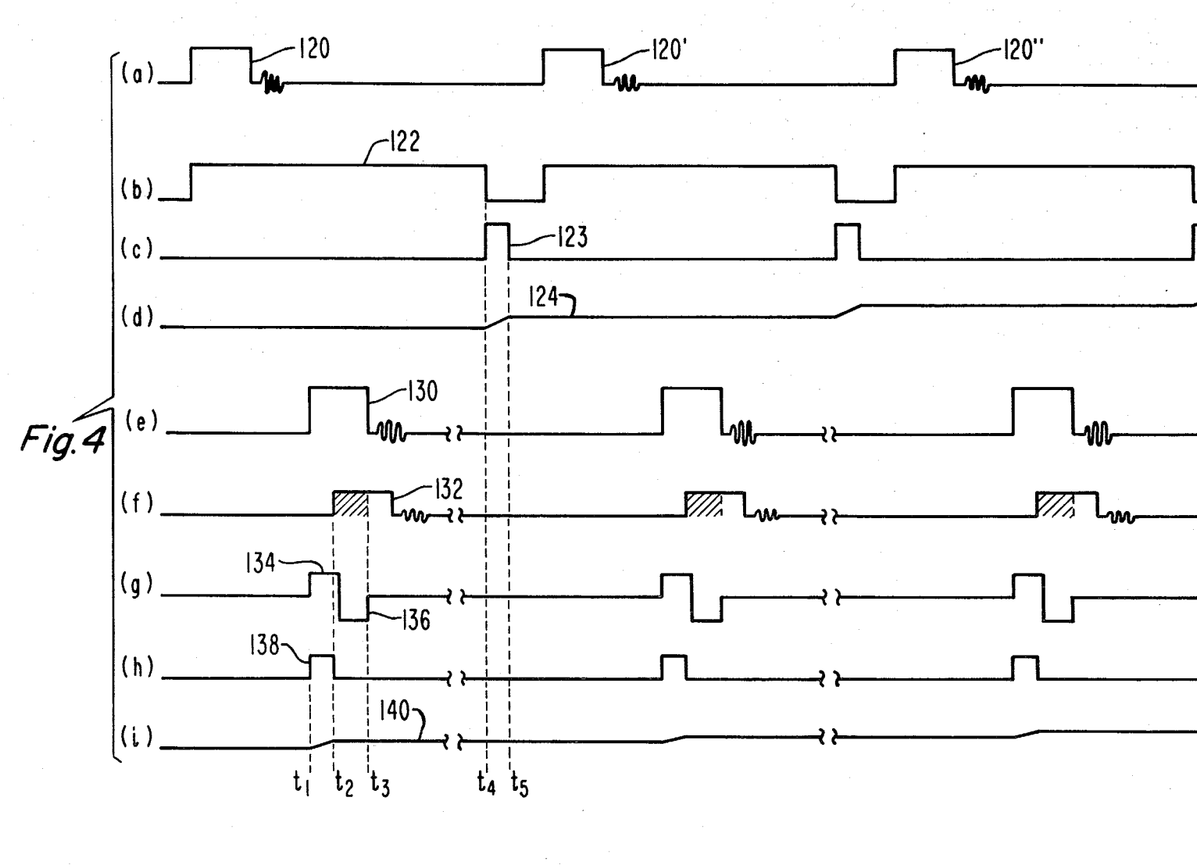
FIGS. 4 through 8 illustrate waveforms used to explain the operation of the arrangements of FIGS. 2 and 3.

The operation of the embodiment of FIG. 2 may be understood by referring to the waveforms of FIGS. 4 and 5. FIG. 4a represents the signals of three of the line of the vertical blanking interval following the second equalizing pulse interval, such as lines 10, 11 and 12. Each of these lines contains a horizontal sync pulse (120, 120', 120") followed by a burst signal. Sync pulses 120, 120' and 120" are separated from the incoming video signal and are applied to AND gate 60, which also receives an enabling lines 10-16 keying pulse during this time. The output of AND gate 60 goes high in response to each sync pulse, which triggers monostable multivibrators 62 to produce pulses 122, as shown in FIG. 4b. The leading edge of pulse 122 resets flip-flop 66, the Q output of which will disable the coincidence adjustment circuit 100, while the high $\overline{Q}$ output enables the incremental delay adjustment circuit 70. At the end of pulse 122, the "0" output of monostable multivibrator 62 triggers monostable multivibrator 64, which responds by producing a pulse 123, as shown in FIG. 4b, occupying a time interval $t_4$–$t_5$. Pulse 123 is passed by AND gate 72 to key the current source 74, which charges capacitor 76 during the time interval $t_4$–$t_5$. The voltage level of capacitor 76 is thereby increased, as shown by waveform 124 of FIG. 4d. The frequency of the VCO 18, and hence the delay of the delay line 12, is thus incrementally changed. A typical delay increment would be one microsecond, for example. For purposes of this illustration, it will be assumed that a low control voltage for the VCO will produce a high frequency signal and hence a short delay line delay, and that a high control voltage will produce a low frequency signal and hence a long delay line delay. Thus, it is seen that if no ghost signal is detected, the incremental delay adjustment circuit will increase the delay of the delay line from its minimum delay to its maximum delay in one microsecond increments during each of lines 10-16 over several television fields. When the voltage across capacitor 76 exceeds its maximum valus $V_M$, corresponding to the maximum desired delay line delay, comparator 82 produces an output pulse to trigger monostable multivibrator 84. The signal at the "0" output of monostable multivibrator 84 disabled AND gate 72 to turn off the current source 74, and the "1" output of the monostable multivibrator 84 closes switch 80 to discharge capacitor 76. The circuit 70 is then in a condition to recycle the delay line 12 through its delay range.

The pulse 122 produced by monostable multivibrator should be longer than the maximum delay of the delay line 12 plus approximately eleven microseconds, since the effect of this pulse is to hold off any changes in VCO frequency and delay until the main sync and burst signals have passed through the delay line 12. The pulse 123 produced by monostable multivibrator 64 should be of a duration to charge capacitor 76 by a chosen increment in accordance with the VCO control voltage characteristic. The pulse produced by monostable multivibrator 84 should be long enough to discharge 76, and, in any event, longer than the duration of pulse 123.

When the video signal is contaminated by a ghost signal exhibiting a delay within the range of the delay line delay, the incremental delay adjustment circuitry will soon cause the delay line length to be close to the delay between the main and ghost signals, at which time a coincidence pulse will be produced. A typical signal condition under these circumstances is shown in FIGS. 4e and 4f, where waveform 130 of FIG. 4e respresents the delayed main signal at the output of delay line 12 and waveform 132 represents the ghost signal at the input of the delay line. Waveforms 4e–4i are drawn to the same time scale, and sync pulses 130 and 132 are seen to be coincident during the shaded interval $t_2$–$t_3$ of pulse 132. A coincidence pulse will be produced during the interval $t_2$–$t_3$, which will set flip-flop 66. The flip-flop 66 will thus disable the incremental adjustment circuit 70 which will fix the voltage across capacitor 76 at its present value. The flip-flop 66 also enables the coincidence adjustment circuit 100 by enabling AND gate 102. The circuit 100 operates by producing an early/late gate pulse as shown in FIG. 4f in response to each delayed sync pulse 130 produced by the clipping circuit 16. The early/late gate pulse is comprised of a positive-going half 134 and a negative-going half 136. When switch 108 is closed, the early/late gate pulse will charge or discharge capacitor 110. When resistors 78 and 114 are connected to the same input terminal of the VCO 18, capacitor 110 will be charged to the same level as capacitor 76 when AND gate 102 closes switch 112 in response to pulse 123 of monostable multivibrator 64. Thus, the early/late gate pulse will alter this charge level, which will then be applied to the VCO input when switch 112 again closes in response to pulse 123. The capacitors will then equalize to a new voltage level to adjust the VCO frequency and hence the delay of delay line 12.

For example, for the coincident condition represented by the timing of pulses 130 and 132 of FIGS. 4e and 4f, the portion of early/late gate pulse 134 during the interval $t_1$–$t_2$ will be applied to the capacitor 110, as illustrated by pulse 138 of FIG. 4h. The coincidence pulse will open switch 108 during the interval $t_2-t_3$. The volage across capacitor 110 will thus be incremented during the interval $t_1-t_2$, as shown by voltage waveform 140 in FIG. 4i. The VCO frequency will be decreased and the delay line delay increased to bring pulses 130 and 132 more fully into coincidence.

Figure 5:
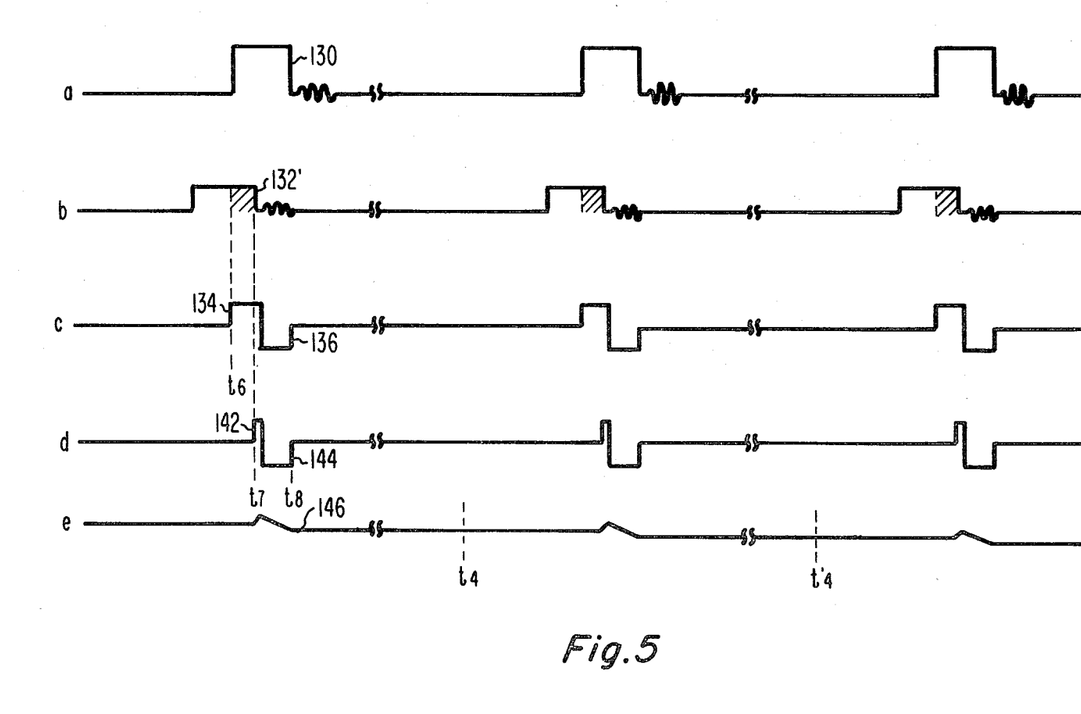

If the delayed main signal 130 and the ghost signal 132′ are in the relative time positions representatively shown in FIGS. 5a and 5b, respectively, the sync pulses will be coincident during the interval $t_6-t_7$. Switch 108 will be opened during this interval, and only that portion of the early/late gate pulse 134, 136 of FIG. 5c occurring during the interval $t_7-t_8$ will be applied to capacitor 110, as shown by early/late gate portions 142 and 144 in FIG. 5d. The net result of pulse portions 142 and 144 will be a discharge of capacitor 110 to a lower voltage level, as illustrated by voltage waveform 146 of FIG. 5e. Once again, this voltage level will be applied to the VCO input at time $t_4$ when switch 112 is closed. This will accordingly increase the VCO frequency and decrease the delay of delay line 12 to bring pulses 130 and 132′ more fully into coincidence.

Figure 7:
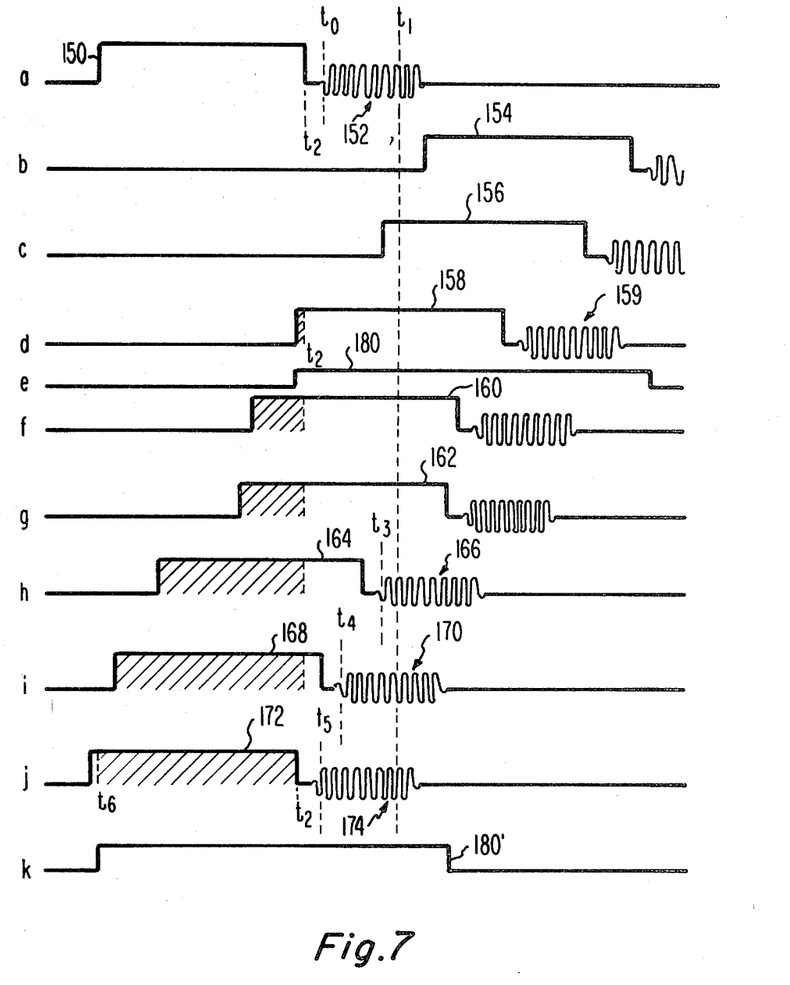

A typical detection sequence that can occur under control of the arrangement of FIGS. 2 and 3 is illustratively shown in FIG. 7. At the start of the sequence, the VCO frequency is assumed to be high (i.e., capacitor 76 is discharged) so that the delay line delay is shorter than the delay between the main and ghost signals. Under these conditions, the delayed main signal, shown in FIG. 7a, will appear at the output of the variable delay line 12 before its ghost signal, shown in FIG. 7b, is applied to the input of the delay line. (The main signal will exhibit a greater amplitude than its ghost, but is shown as the same amplitude as its ghost signal in FIG. 7 for ease of comparison.) The delayed main signal of FIG. 7a is comprised of a horizontal sync pulse 150 which ends at time $t_2$, followed by a burst signal 152 occurring during the time interval $t_0-t_1$. The ghost signal of FIG. 7b includes a sync pulse 154.

Since the sync pulses 150 and 154 are not in time coincidence, the incremental delay adjustment circuit 70 will increment the VCO control voltage, thereby decreasing the VCO frequency and increasing the delay of the delay line 12. When the gate 10 applies the next one of lines 10-16 to the delay line, the delayed main signal will lead the ghost signal in time by a lesser amount, as represented by the time location of ghost signal 156 of FIG. 7c with respect to the delayed main signal of FIG. 7a. The incremental delay adjustment circuit will then increase the voltage across capacitor 76 once again.

Figure 6:
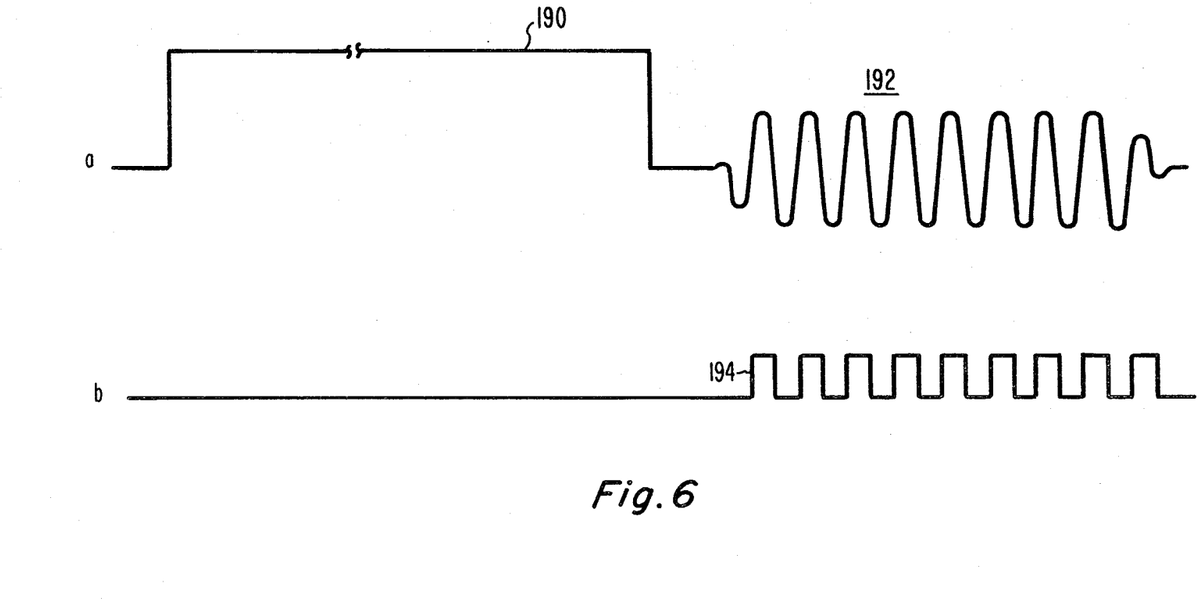

After the passage of several more of lines 10-16 through the delay line, the delayed main signal and the undelayed ghost signal will assume the relative time positions of FIGS. 7a and 7d. In this time alignment, main sync pulse 150 and its ghost sync pulse 158 are seen to be in partial time coincidence immediately before time $t_2$. A coincidence signal will be produced during this time, which will set flip-flop 66 and turn control of the delay line delay over to the coincidence adjustment circuit 100. The coincidence signal also triggers monostable multivibrator 40, which produces a pulse 180 as shown in FIG. 7e. During the occurrence of pulse 180, counters 46 and 48 are not reset, and are able to count pulses applied to their signal inputs by amplifier-limiters 33 and 34 by way of gates 42 and 44. Amplifier-limiters 33 and 34 produce amplified and limited signals in a response to the burst signals passed by filters 31 and 32, respectively. The signals applied to filters 31 and 32 are representatively shown in FIG. 6a, including horizontal sync pulse 190 and burst signal 192. The burst signal is at a frequency of approximately 3.58 MHz in the NTSC system, and lasts for eight to eleven cycles. The burst signal 192 is passed by the filters to the amplifier-limiters, which responsively produce the pulse waveform 194 of FIG. 6b. The nine-cycle burst signal 192 is thus seen to produce nine pulses in waveform 194.

The burst signal pulse train 194, which is derived from the burst signal 192 of FIG. 7a, is inverted by NAND gate 44 and applied to counter 48. Due to the signal inversion, the falling edges of the pulses of FIG. 6b will clock the counter, which will reach a count of seven at time $t_1$. The seven count will be detected by NAND gate 50, causing the output of this gate to go low, thereby disabling gates 42 and 44 from passing further pulses. With gate 42 thus disabled, the burst pulse train derived from burst signal 159 of the ghost signal of FIG. 7d is prevented from reaching counter 46. At the end of monostable multivibrator pulse 180, the counters are again reset. Toward the end of the line, the VCO frequency is again decreased, this time under control of the early/late gate signal of the coincidence adjustment circuit 100.

During the passage of several more of lines 10-16, the delayed main signal and the ghost signal will be brought more completely into time coincidence by the coincidence adjustment circuit 100, as represented by ghost signals 160, 162 and 164 of FIGS. 7f-7h with respect to the main signal of FIG. 7a. During each of these lines, counter 48 will count seven of the pulses derived from the main burst signal. For the conditions represented by FIGS. 7f and 7g, counter 46 will receive no pulses, but will begin to count ghost burst pulses of the waveform of FIG. 7h.

Figure 8:
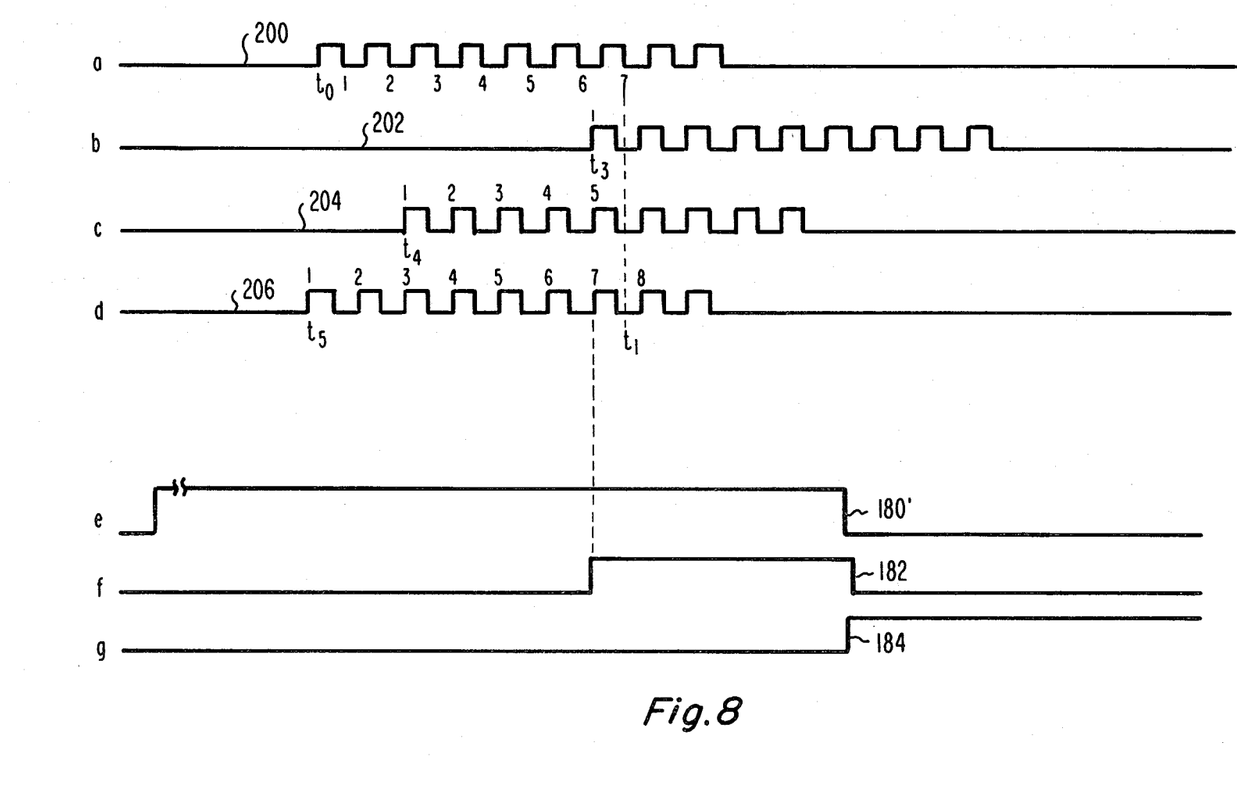

A typical pulse train 200 derived from the delayed main burst signal 152 of FIG. 7a is shown in FIG. 8a. A typical pulse train 202, derived from the ghost burst signal 166 of FIG. 7h, is shown in FIG. 8b. The first seven pulses of pulse train 200 are counted by counter 48 during the interval $t_0-t_1$, and pulses of the ghost pulse train 202 are counted by counter 46 during the interval $t_3-t_1$. Since the pulse train 202 is applied to counter 46 by an AND gate 42, counter 46 is incremented at the leading edges of the ghost pulse train. At time $t_1$ gates 42 and 44 are blocked by the signal from gate 50, and the counters are stopped with counter 46 holding a count of one. When the pulse produced by the monostable multivibrator 40 ends, the counters are again reset. Thereafter, the delay line delay is again increased under control of the coincidence adjustment circuit 100.

After the passage of several more of lines 10-16 through the system, the signals at the input and output of the delay line 12 will assume the time positions shown by the waveforms of FIGS. 7i and 7a. Counter 48 will once again count seven pulses during time $t_0-t_1$, and counter 46 will count pulses derived from ghost burst signal 170 during the interval $t_4-t_1$, as shown in FIGS. 8a and 8c. Ghost burst pulse train 204 of FIG. 8c contains five pulses during the $t_4-t_1$ interval, and counter 46 will hold a count of five when counter 48 reaches its count of seven. The counters will again be reset at the end of the pulse produced by monostable multivibrator 40, and the coincidence adjustment circuit 100 will again operate to bring the delayed and undelayed signals more fully into time coincidence.

After passage of one or more of lines 10-16 through the system, the signals at the input and output of the delay line 12 will be in the time positions representatively shown in FIGS. 7j and 7a. The coincidence detector 14 will produce a coincidence pulse during the shaded area of ghost sync pulse 172 in FIG. 7j, during the interval $t_6$–$t_2$. During the interval $t_0$–$t_1$, the counter 48 will count the first seven pulses of main burst signal pulse train 200 of FIG. 8a, and during the interval $t_5$–$t_1$, the counter 46 will count the first seven pulses of ghost burst signal pulse train 206 of FIG. 8d. When counter 46 reaches a count of seven, the output signal of gate 7 will go high, as shown by pulse 182 of FIG. 8f. At time $t_1$, the counters stop counting, with both counters holding a count of seven. Gate 7 is now in a condition to apply a high signal to the D input of flip-flop 54. When the pulse 180' produced by the monostable multivibrator 40 goes low, as shown in FIGS. 7k and 8e, the signal at the output of inverter 52 clocks the flip-flop 54 to its "set" condition as the counters 46 and 48 are being reset. The $\overline{Q}$ output of flip-flop 54 goes low at this time, disabling gate 102 of FIG. 2 so that the coincidence adjustment circuit 100 will no longer control the VCO frequency. The Q output of flip-flop 54 goes high, as shown by waveform 184 in FIG. 8g, which enables gate 38. The VCO frequency and delay line delay are now controlled by the signal resulting from the phase comparison of the $G_B$ and $M_B$ signals by phase detector 36. From FIGS. 8a and 8d, it can be seen that, when the two counters both are stopped at a count of seven, the two burst signals are within plus or minus one-half cycle of complete coincidence. The fine adjustment circuitry 30 will now operate to bring the ghost and main signals into full time coincidence at the input and output of the delay line through phase comparison of the respective burst signals $G_B$ and $M_B$.

It may also be noted that if the delay line delay is too great, counter 46 will reach a count of eight or more before counter 48 reaches a count of seven. Under these conditions, flip-flop 54 will not be set, since the output of AND gate 7 will be low at the termination of the pulse from monostable multivibrator 40, and the coincidence adjustment circuit 100 will continue to control the VCO and delay line delay to pull the main and ghost pulses back into more complete coincidence.

The arrangement of FIGS. 2 and 3 may advantageously be used with a variety of delay line configurations. For instance, the delay line may comprise an addressable length tapped delay line and a VCO-controlled variable delay line. The output signal produced by the incremental delay adjustment circuit 70 can be used to control a multiplexer and/or counter, which can select one of the taps of the delay line, which may, for example, be separated in time by four microseconds. The lines 10-16 signals can be delayed by the tapped delay line in multiples of four microseconds until partial sync signal coincidence occurs, at which time the VCO-controlled delay line would increase or decrease the main signal delay under control of the coincidence adjustment circuit 100 and the fine adjustment circuitry 30. The main signal would then be delayed by the cumulative delays of both the tapped delay line and the VCO-controlled delay line. In this configuration, the ghost detector arrangement could search for a ghost signal over virtually the full line, and the VCO-controlled delay line would only need to provide a small variable delay range of approximately five microseconds.

What is claimed is:

1. In a television receiver, including a source of video signals subject to contamination by ghost signals, said video signals including a signal interval suitable for use as a training signal interval, including a color burst signal component; a television ghost signal detector system comprising:
    a variable delay line having a signal input and a signal output;
    means, coupled to said variable delay line, for controlling the signal delay exhibited by said delay line between its input and its output;
    means, coupled to said signal input of said variable delay line, for applying said video signals to said delay line input during said training signal interval; and
    a tracking circuit having inputs coupled to the input and the output of said variable delay line, and an output coupled to said controlling means, and responsive to the appearance of a delayed burst signal component at the output of said delay line and to the appearance of a ghost of said burst signal component at the input of said delay line when a ghost signal is present, a phase detector means having inputs coupled to the input and output of said delay line for developing a control signal representative of the phase relationship of said delayed burst signal component at the output of said delay line and its ghost signal component at the input of said delay line, and means for applying said control signal to said controlling means for controlling said variable delay line in response to the phase relationship of said delayed burst signal component and its ghost signal component.

2. The arrangement of claim 1, wherein said training signal interval further includes a signal suitable for use as a training signal; and wherein said television ghost signal detector system further comprises:
    a second tracking circuit having inputs coupled to the input and to the output of said variable delay line, and an output coupled to said controlling means, and responsive to the appearance of a delayed training signal component at the output of said delay line and to the appearance of a ghost of said training signal component at the input of said delay line when a ghost signal is present for controlling said variable delay line so as to exhibit a delay between its input and output which is approximately equal to the delay between said training signal component and its ghost signal component.

3. In a television receiver, including a source of video signals subject to contamination by ghost signals, said video signals including a signal interval suitable for use as a training signal interval, including a training signal component and a burst signal component; a television ghost signal detector system comprising:
    a variable delay line having a signal input and a signal output;
    means, coupled to said variable delay line, for controlling the signal delay exhibited by said delay line between its input and its output;
    means, coupled to said signal input of said variable delay line, for supplying said video signals to said delay line input during said training signal interval;
    a first tracking circuit having inputs coupled to the input and the output of said variable delay line, and an output coupled to said controlling means, and responsive to the appearance of a delayed training signal component at the output of said delay line and to the appearance of a ghost of said training signal component at the input of said delay line when a ghost signal is present for controlling said variable delay line so as to exhibit a delay between its input and output which is approximately equal to the delay between said training signal component and its ghost signal component; and a second tracking circuit having inputs coupled to the input and the output of said variable delay line, and an output coupled to said controlling means, and responsive to the appearance of a delayed burst signal component at the output of said delay line and to the appearance of a ghost of said burst signal component at the input of said delay line when a ghost signal is present, a phase detector means having inputs coupled to the input and output of said delay line for developing a control signal representative of the phase relationship of said delayed burst signal component at the output of said delay line and its ghost signal component at the input of said delay line, and means for applying said control signal to said controlling means for controlling said variable delay line in response to the phase relationship of said delayed burst signal component and its ghost signal component so as to exhibit a delay between the input and output of said delay line which is substantially equal to the delay between video signals and said ghost signals.

4. The arrangement of claim 3, wherein said first tracking circuit includes:

a coincidence detector having inputs coupled to the input and the output of said variable delay line for detecting the coincident appearance of a delayed training signal at the output of said delay line and its ghost signal at the input of said delay line; and a delay adjustment circuit coupled between said coincidence detector and said controlling means, for incrementally changing the delay of said delay line between applications of said training signal component to said delay line until said delayed training signal and its ghost signal appear at the output and input of said delay line, respectively, in approximately full coincidence.

5. The arrangement of claim 4, wherein said second tracking circuit includes:

means for applying said control signal to said controlling means when said delayed burst signal component and its ghost signal component at the output and input of said delay line, respectively, are in approximately full coincidence.

6. The arrangement of claim 5, wherein said means for applying said control signal to said controlling means applies said control signal when said delayed burst signal component and its ghost signal component at the output and input of said delay line, respectively, are within one burst signal cycle of full coincidence; and further comprising:

means, coupled to said delay adjustment circuit for inhibiting the operation thereof when said delayed burst signal component and its ghost signal component at the output and input of said delay line, respectively, are within one burst signal cycle of full coincidence.

7. The arrangement of claim 6, wherein said controlling means comprises a voltage controlled oscillator.

8. The arrangement of claim 3, wherein said second tracking circuit includes means for enabling said second tracking circuit during conditions of substantial time coincidence of the appearance of said burst signal component at the output of said delay line and of its ghost signal component at the input of said delay line.

9. The arrangement of claims 3 or 5, wherein said training signal interval comprises one horizontal line interval of a vertical blanking interval, said training signal component comprises a horizontal synchronizing signal, and said supplying means comprises means for applying said video signals, including said horizontal synchronizing signal and said burst signal component, to the input of said delay line during said one horizontal line interval of said vertical blanking interval.

* * * * *